Nov. 17, 1953     H. R. WENGER     2,659,176
FISHING LURE
Filed Aug. 22, 1951
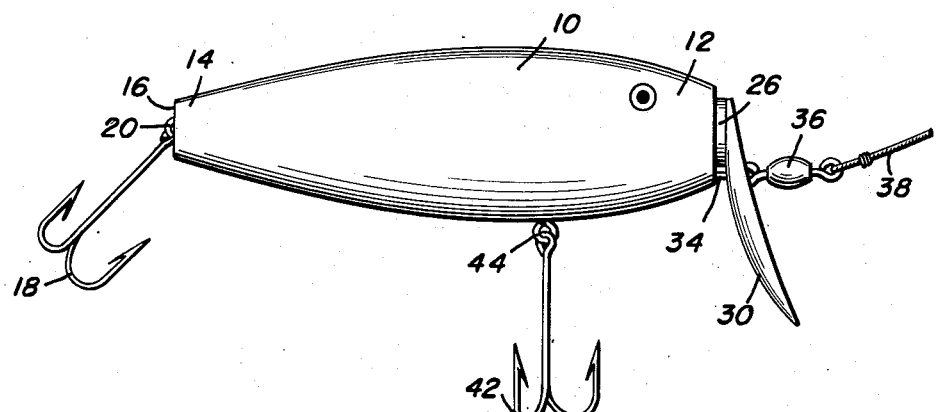
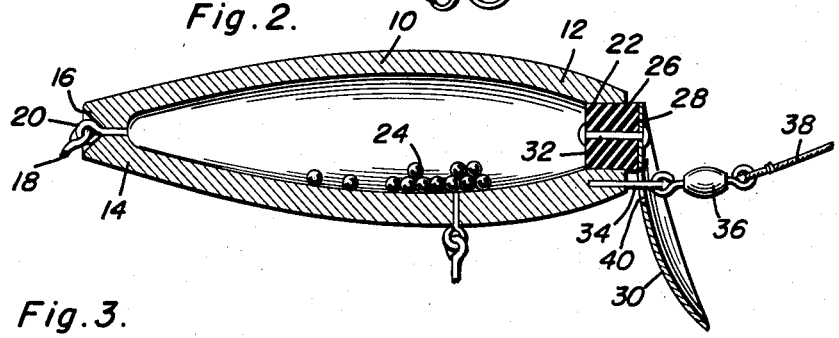
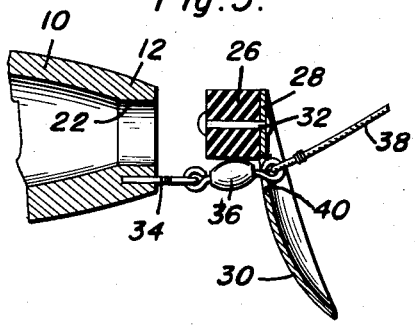
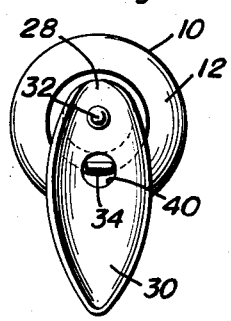
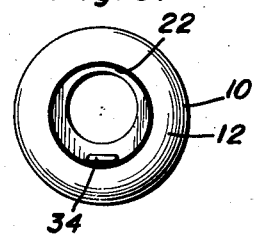
Harvey R. Wenger
INVENTOR.

Patented Nov. 17, 1953

2,659,176

UNITED STATES PATENT OFFICE 2,659,176

FISHING LURE

Harvey R. Wenger, Sabetha, Kans.

Application August 22, 1951, Serial No. 243,041

2 Claims. (Cl. 43—42.31)

This invention relates to new and useful improvements in fishing lures and the primary object of the present invention is to provide a fish lure so constructed as to permit the same to move through a fluid medium in an erratic motion to attract fish thereto.

Another important object of the present invention is to provide a fish lure including a hollow body adapted to receive ballast in the form of rollable balls and having an open end that is closed by a plug that supports a guide spoon for the body.

A further object of the present invention is to provide a lure of the aforementioned character involving a line attaching member secured to the body and passing through a slot in the spoon, whereby the spoon and plug will be retained relative to the body even though the plug may be accidentally removed from the body.

A still further aim of the present invention is to provide a fishing lure that is extremely simple and practical in construction, strong and reliable in use, small and compact in structure, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the present lure;

Figure 2 is a longitudinal vertical sectional view through the center of Figure 1;

Figure 3 is a fragmentary view of Figure 2 but showing the plug and spoon removed from the body;

Figure 4 is a front view of Figure 1, the swivel member removed; and,

Figure 5 is a front view of Figure 1, the spoon, plug and swivel member being removed.

Referring now to the drawings in detail, wherein for the purpose of illustration, there is disclosed a preferred embodiment of the present invention, the numeral 10 represents an elongated hollow body having forward and rear tapered ends 12 and 14.

The rear end of the body is recessed, as at 16, to accommodate the shank of a hook 18 and an eye member 20, the latter being secured to the body and attached to the hook 18. The forward end of the body is formed with an opening 22, whereby balls 24 may be placed in the body to roll back and forth to cause the body to move irregularly through a fluid medium.

A resilient plug 26 is fitted in the opening 22 to close the same. The flat upper end 28 of a concavo-convexed guide spoon 30 is secured against the flat forward face of the plug 26 by a fastener (rivet) 32 that extends axially through the plug.

The rear end of a line attaching member 34 is fixed to the forward end of the body 10 and terminates in a loop that engages a swivel member 36 to which is attached a line 38. The spoon 30 is formed with a slot or opening 40 to permit the spoon to clear the swivel member. The spoon and plug will be retained on the member 34, 36 or the line 38 should the plug become disengaged from opening 22.

A forward hook 42 is secured to an eye member 44 depending from the body 10 adjacent its forward end.

In practical use of the present invention, as the body is pulled through a fluid medium, the balls 24 will roll back and forth and from side to side to cause the body 10 to wobble and undulate and thereby attract fish thereto.

The dual function of the plug as a closure for the opening 22 and a support for the spoon is an important feature as well as the opening 40 whereby loss of the plug and spoon is prevented since the same will be retained on the line engaging means.

Obviously, the spoon 30 may be of various shapes either of the type shown or round and concavo-convexed. The balls 24 may be increased or decreased in number to vary the depth of the plug in a fluid medium. Also, as the balls roll back and forth in the hollow lure body they will cause vibrations tending to attract fish thereto.

Having described the invention, what is claimed as new is:

1. A fishing lure comprising an elongated hollow one piece rigid body open at its forward end and closed at its rear end, a plug frictionally fitted in the open end of said body and having a flat front face, a guide spoon having a flat portion at its upper end fixed against the front face of the plug, a line attaching member fixed to the forward end of said body, and a line attached to said member, said spoon having an opening accommodating said member and permitting retention of said spoon and plug on the member when the plug is removed from the body.

2. A fishing lure comprising an elongated one piece rigid body having an opening in its forward end, a resilient plug frictionally fitted in said opening and having a flat front face, a spoon having a flat portion at its upper end contacting the front face of the plug, a fastener extending through the plug and the upper end of the spoon and securing the flat portion of the spoon to the flat front face of the plug, a line attaching member fixed to the forward end of the body below the plug, said spoon having an opening through which said line attaching member projects, and a line attached to said member, said plug and said spoon being retained on the line when the plug is removed from the opening in said body.

HARVEY R. WENGER.

References Cited in the file of this patent

UNITED STATES PATENTS

| Number | Name | Date |
|---|---|---|
| 1,878,015 | Steffensen | Sept. 20, 1932 |
| 2,295,292 | Rogers | Sept. 8, 1942 |
| 2,532,879 | Baker | Dec. 5, 1950 |

FOREIGN PATENTS

| Number | Country | Date |
|---|---|---|
| 566,753 | Great Britain | Jan. 11, 1945 |
| 619,994 | Great Britain | Mar. 17, 1949 |